US012573863B2

(12) United States Patent
Jayaraj et al.

(10) Patent No.: US 12,573,863 B2
(45) Date of Patent: Mar. 10, 2026

(54) MULTI-LEVEL MITIGATION SYSTEM AND METHOD FOR MANAGING AN EMERGENCY BATTERY CONDITION BASED ON SEVERITY

(71) Applicant: Honeywell International Inc., Charlotte, NC (US)

(72) Inventors: Sandeep Jayaraj, Bangalore (IN); Veeresh Shivaprakash Yagati, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 783 days.

(21) Appl. No.: 17/811,664

(22) Filed: Jul. 11, 2022

(65) Prior Publication Data

US 2024/0014673 A1 Jan. 11, 2024

(51) Int. Cl.
H02J 7/00 (2006.01)
H01M 10/42 (2006.01)
(Continued)

(52) U.S. Cl.
CPC ........... H02J 7/663 (2026.01); H01M 10/425 (2013.01); H01M 10/441 (2013.01);
(Continued)

(58) Field of Classification Search
CPC ..... H02J 7/0031; H02J 7/0013; H01M 10/425
See application file for complete search history.

(56) References Cited

U.S. PATENT DOCUMENTS 5,834,131 A 11/1998 Lutz et al.
2013/0017421 A1 1/2013 Onnerud et al.
(Continued)

FOREIGN PATENT DOCUMENTS

CN 103568854 A 2/2014
CN 204118138 U 1/2015
(Continued)

OTHER PUBLICATIONS

Extended European Search Report Mailed on Jun. 26, 2024 for EP Application No. 23178444, 8 page(s).
(Continued)

*Primary Examiner* — Robert Grant
(74) *Attorney, Agent, or Firm* — Alston & Bird LLP

(57) ABSTRACT
A battery management system, method, and computer program for mitigating a battery condition, according to a multi-level mitigation system and based on the severity of the battery condition, is provided. An example battery management system may include a battery with a battery housing defining an interior battery compartment, one or more battery cells disposed within the interior battery compartment, and one or more internal sensing elements attached to the battery housing within the interior battery compartment. The battery management system may further include a controller in electrical communication with the one or more internal sensing elements. In addition, the controller of the battery management system may select between a plurality of mitigating actions based at least in part on a battery condition. The plurality of mitigating actions available to the controller may include at least a non-destructive mitigating action and a destructive mitigating action.

14 Claims, 6 Drawing Sheets

100

(51) Int. Cl.
    *H01M 10/44*       (2006.01)
    *H01M 10/48*       (2006.01)
    *H02J 7/50*         (2026.01)
    *H02J 7/60*         (2026.01)
    *H02J 7/80*         (2026.01)

(52) U.S. Cl.
    CPC ............. *H01M 10/482* (2013.01); *H02J 7/50* (2026.01); *H02J 7/80* (2026.01); *H01M 2010/4271* (2013.01); *H01M 2220/20* (2013.01)

(56)         References Cited

U.S. PATENT DOCUMENTS

| | | | |
|---|---|---|---|
| 2013/0106362 A1 | 5/2013 | Mackintosh et al. | |
| 2020/0014006 A1 | 1/2020 | Oliveira et al. | |
| 2021/0151808 A1* | 5/2021 | Feng | ................. H01M 10/6567 |
| 2022/0077515 A1 | 3/2022 | Leyvi et al. | |
| 2022/0085428 A1 | 3/2022 | Engle et al. | |

FOREIGN PATENT DOCUMENTS

| | | |
|---|---|---|
| CN | 213483839 U | 6/2021 |
| CN | 113316863 A | 8/2021 |
| EP | 3249736 A1 | 11/2017 |
| EP | 2507891 B1 | 3/2018 |
| JP | 2011-249015 A | 12/2011 |

OTHER PUBLICATIONS

IN Office Action Mailed on Oct. 28, 2025 for IN Application No. 202314039417, 6 page(s).

* cited by examiner

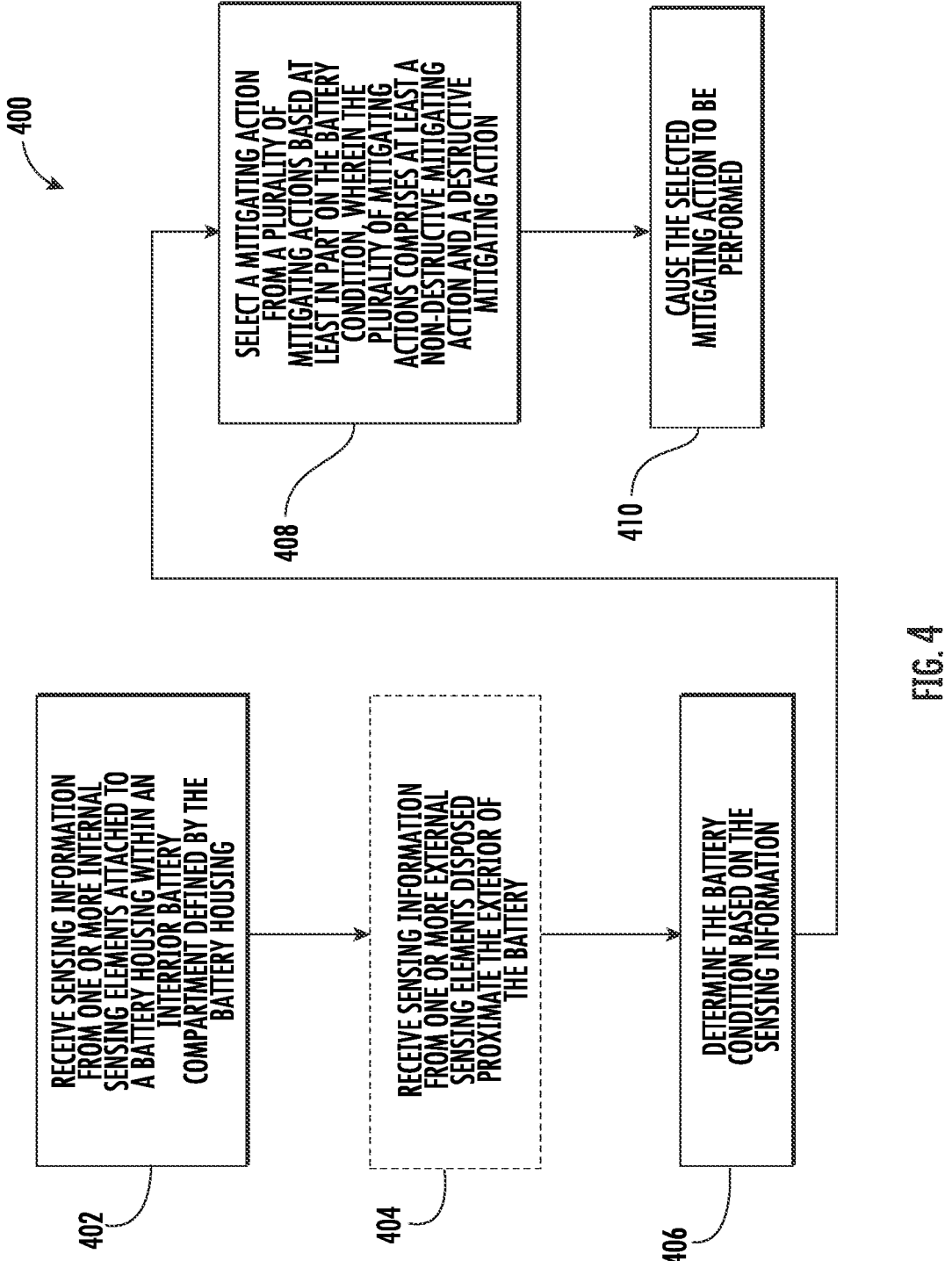

400

402 RECEIVE SENSING INFORMATION FROM ONE OR MORE INTERNAL SENSING ELEMENTS ATTACHED TO A BATTERY HOUSING WITHIN AN INTERIOR BATTERY COMPARTMENT DEFINED BY THE BATTERY HOUSING

404 RECEIVE SENSING INFORMATION FROM ONE OR MORE EXTERNAL SENSING ELEMENTS DISPOSED PROXIMATE THE EXTERIOR OF THE BATTERY

406 DETERMINE THE BATTERY CONDITION BASED ON THE SENSING INFORMATION

408 SELECT A MITIGATING ACTION FROM A PLURALITY OF MITIGATING ACTIONS BASED AT LEAST IN PART ON THE BATTERY CONDITION, WHEREIN THE PLURALITY OF MITIGATING ACTIONS COMPRISES AT LEAST A NON-DESTRUCTIVE MITIGATING ACTION AND A DESTRUCTIVE MITIGATING ACTION

410 CAUSE THE SELECTED MITIGATING ACTION TO BE PERFORMED

FIG. 4

MULTI-LEVEL MITIGATION SYSTEM AND METHOD FOR MANAGING AN EMERGENCY BATTERY CONDITION BASED ON SEVERITY

TECHNOLOGICAL FIELD

Embodiments of the present disclosure relate generally to a battery management system, and more particularly, to a multi-level mitigation system for managing a detected emergency state of an electric vehicle battery according to the severity of the detected event.

BACKGROUND

Applicant has identified many technical challenges and difficulties associated with mitigating a detected emergency related to an electric vehicle battery. Through applied effort, ingenuity, and innovation, Applicant has solved problems related to mitigation techniques employed to manage a battery emergency event based on the severity of the event, which are described in detail below.

BRIEF SUMMARY

Various embodiments are directed to an example system and method for mitigating an emergency event related to the battery of an electric vehicle based on the severity of the abnormalities and/or defects of the battery.

In accordance with some embodiments of the present disclosure, an example battery management system is provided. In some embodiments, the battery management system may comprise a battery comprising a battery housing defining an interior battery compartment, one or more battery cells disposed within the interior battery compartment, and one or more internal sensing elements attached to the battery housing within the interior battery compartment. The battery management system may further comprise a controller in electrical communication with the one or more internal sensing elements. In addition, the controller may select between a plurality of mitigating actions based at least in part on a battery condition and the plurality of mitigating actions may comprise at least a non-destructive mitigating action and a destructive mitigating action.

In some embodiments, the battery management system, may further comprise a switching mechanism to disengage an electrical power source and/or an electrical load connected to the battery, wherein one of the at least one non-destructive mitigating actions comprises utilizing the switching mechanism to disengage the electrical power source and/or the electrical load.

In some embodiments, the battery management system, may further comprise an exterior wall enclosing one or more sides of the battery housing and defining a battery wall cavity between the battery housing and the exterior wall; a first polymer reservoir disposed external to the exterior wall and holding a first polymer material; a first polymer fluid conduit providing fluid communication between the first polymer reservoir and the battery wall cavity; and a first actuating element having an opened position and a closed position, wherein when the first actuating element is in the closed position, flow from the first polymer reservoir to the battery wall cavity is substantially stopped, and when the first actuating element is in the open position, flow from the first polymer reservoir to the battery wall cavity is permitted.

In some embodiments, the battery management system may further comprise a second polymer material disposed in the battery wall cavity defined between the battery housing and the exterior wall, wherein one of the at least one non-destructive mitigating actions comprises opening the first actuating element such that the first polymer material interacts with the second polymer material in the battery wall cavity and prevents the interior battery compartment from receiving oxygen.

In some embodiments, the battery management system may further comprise a second polymer fluid conduit providing fluid communication between the first polymer reservoir holding the first polymer material and the interior battery compartment; a second actuating element having an opened position and a closed position, wherein when the second actuating element is in the closed position, flow from the first polymer reservoir to the interior battery compartment is substantially stopped, and when the second actuating element is in the open position, flow from the first polymer reservoir to the interior battery compartment is permitted; a third polymer fluid conduit providing fluid communication between a second polymer reservoir holding a third polymer material and the interior battery compartment; and a third actuating element having an opened position and a closed position, wherein when the third actuating element is in the closed position, flow from the second polymer reservoir to the interior battery compartment is substantially stopped, and when the third actuating element is in the open position, flow from the second polymer reservoir to the interior battery compartment is permitted, wherein one of the at least one destructive mitigating actions comprises opening the second and third actuating elements such that the first polymer material interacts with the second polymer material in the interior battery compartment and prevents one or more components of the interior battery compartment from receiving oxygen.

In some embodiments, the first polymer reservoir and the second polymer reservoir may be pressurized.

In some embodiments, the one or more internal sensing elements may comprise at least one of a temperature sensing element, a pressure sensing element, and a gas sensing element.

In some embodiments, the battery management system, may further comprise one or more external sensing elements proximate the exterior of the battery housing, wherein the controller selects between the plurality of mitigating actions based at least in part on an output of the one or more external sensing elements.

In some embodiments, at least one of the one or more external sensing elements detects alcohol levels.

In some embodiments, the battery condition may be one of normal operation, electrolysis, vaporization, first venting, thermal runaway, and fire.

An example method for mitigating a battery condition of a battery is further provided. In some embodiments, the method may comprise receiving sensing information from one or more internal sensing elements attached to a battery housing within an interior battery compartment defined by the battery housing; determining the battery condition based on the sensing information; selecting a mitigating action from a plurality of mitigating actions based at least in part on the battery condition, wherein the plurality of mitigating actions comprises at least a non-destructive mitigating action and a destructive mitigating action; and causing the selected mitigating action to be performed.

In some embodiments, the at least one non-destructive mitigating actions may comprise utilizing a switching mechanism to disengage an electrical power source and/or an electrical load.

In some embodiments, the battery may further comprise a battery housing defining an interior battery compartment and one of the at least one non-destructive mitigating actions may comprise interacting a first polymer material with a second polymer material in a cavity exterior to the interior battery compartment, such that the interaction of the first polymer material and the second polymer material prevents the interior battery compartment from receiving oxygen.

In some embodiments, the battery may further comprise a battery housing defining an interior battery compartment and the at least one destructive mitigating actions may comprise interacting a first polymer material with a second polymer material in the interior battery compartment, such that the interaction of the first polymer material and the second polymer material prevents one or more components of the interior battery compartment from receiving oxygen.

In some embodiments, the one or more internal sensing elements may comprise at least one of a temperature sensing element, a pressure sensing element, and a gas sensing element.

In some embodiments, the method may further comprise receiving sensing information from one or more external sensing elements disposed proximate the exterior of the battery.

In some embodiments, the battery condition may be one of normal operation, electrolysis, vaporization, first venting, thermal runaway, and fire.

An example computer program product for mitigating a battery condition is also provided. In some embodiments, the computer program product may comprise at least one non-transitory computer-readable storage medium having computer-readable program code portions stored therein, the computer-readable program code portions comprising an executable portion configured to receive sensing information from one or more internal sensing elements disposed in the interior of a battery, determine the battery condition based on the sensing information, and select a mitigating action from a plurality of mitigating actions based at least in part on the battery condition, wherein the plurality of mitigating actions comprises at least a non-destructive mitigating action and a destructive mitigating action.

In some embodiments, the battery may further comprise a battery housing defining an interior battery compartment; and one of the at least one non-destructive mitigating actions may comprise interacting a first polymer material with a second polymer material in a cavity exterior to the interior battery compartment, such that the interaction of the first polymer material and the second polymer material prevents the interior battery compartment from receiving oxygen.

In some embodiments, the battery may further comprise a battery housing defining an interior battery compartment and one of the at least one destructive mitigating actions may comprise interacting a first polymer material with a second polymer material in the interior battery compartment, such that the interaction of the first polymer material and the second polymer material prevents one or more components of the interior battery compartment from receiving oxygen.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

FIG. 4 depicts a flowchart illustrating example operations performed by a battery monitoring module to mitigate a detected emergency event related to an electric vehicle battery in accordance with an example embodiment of the present disclosure.

DETAILED DESCRIPTION

Figure 1:
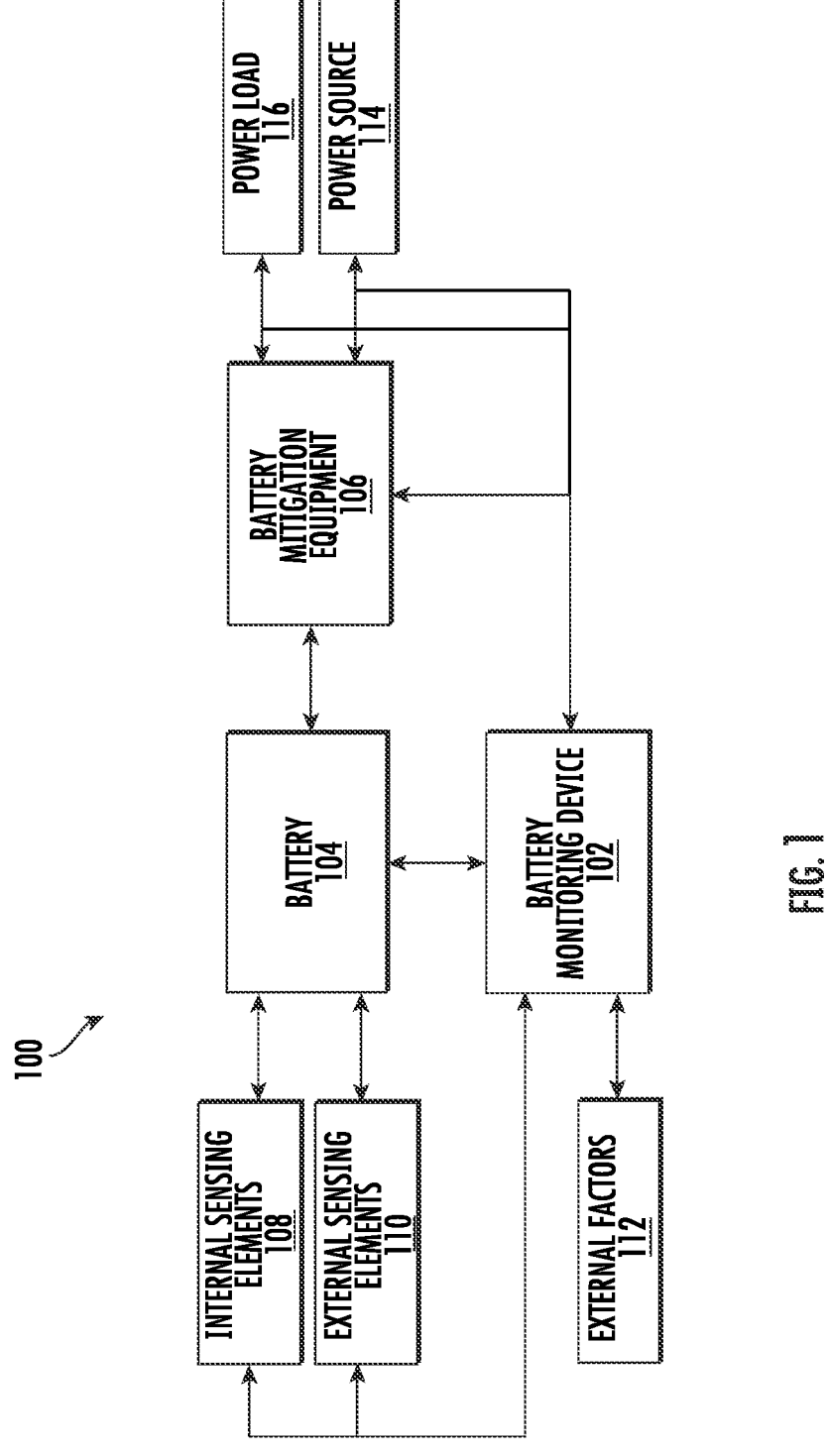
FIG. 1 illustrates an example block diagram of a battery management system in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with responding to a detected battery emergency, such as a battery entering the initial stages of decay which can lead to thermal runaway and eventually combustion. As understood by those of skill in the field to which the present disclosure pertains, there are numerous scenarios where a decaying battery can become a serious hazard if the decay is not detected and handled properly.

Batteries (e.g., lithium-ion batteries, lithium-polymer batteries, etc.) may undergo a chemical reaction to supply power to various devices, for example electric vehicles. As an example, when a lithium-ion battery is discharging, the lithium ions move from the positive electrode/terminal to the negative electrode/terminal, releasing free electrons and providing an electric current to the operating device. To provide sufficient power to a significant electrical load, such as a partially or fully electric vehicle, modern vehicles often utilize battery systems of considerable size and complexity.

Such batteries (e.g., lithium-ion batteries, lithium-polymer batteries, etc.) may be prone to thermal runaway and eventual combustion as a result of mechanical, electrical and/or thermal stress and abuse. Examples of mechanical abuse/stress to a battery may include piercing by objects (e.g., nails), crushing, or forceful impacts. Electrical abuse/stress may include overcharging, over-discharging, or external short circuits. Examples of thermal abuse/stress may include exposure to high temperatures, fire, or radiation. Such conditions may generate excess current within a battery causing a buildup of heat and/or gas to accumulate. Accordingly, in various examples, mechanical, electrical, and/or thermal stress and abuse may lead to conditions which can result in thermal runaway which may spread from one battery cell to another and lead to combustion.

In some examples, a battery management system may disconnect power to the battery once an event is detected. However, often disconnecting power to the battery is not enough to terminate thermal runaway once it has begun and combustion once the battery has entered into thermal runaway. In addition, other battery management systems only have one mitigating action and thus cannot select a mitigating action based on the state of the battery and the severity of the battery decay.

The various example embodiments described herein utilize various techniques to mitigate a detected hazardous condition of an electric vehicle battery based on the severity of the battery condition. For example, in some embodiments, a battery monitoring device may utilize various internal sensors to determine the internal state of the battery. A battery monitoring device may determine the state of decay of a battery based on the pressure, temperature, and/or the presence of certain gases in the interior battery compartment. Depending on the severity of the battery decay, a battery monitoring device may determine a mitigation procedure to neutralize the hazardous condition. In some examples, the battery monitoring device may determine that the necessary recourse is to remove any power supply and/or any source of discharge from the battery. When the state of battery decay is more severe and mitigating action is more urgent, the battery monitoring device may determine non-destructive isolation of the battery is necessary. In some examples, this may be accomplished by injecting a mixture of epoxy resins into a cavity surrounding the interior battery compartment, preventing oxygen from reaching the reacting chemicals. In the most severe cases of battery decay, a battery monitoring device may determine that mitigating action that leads to destructive battery isolation is necessary. In some examples, this may be achieved by injecting a mixture of epoxy resins into the interior compartment of the battery. This mixture of epoxy resins may solidify the interior compartment of the battery, preventing oxygen from reaching the chemical reactions in thermal runaway but destroying the battery in the process. By selecting from mitigating actions of various severity, a battery monitoring device may choose the action that is capable of fully neutralizing the hazard while providing the minimal amount of damage to the battery system.

As a result of the herein described example embodiments and in some examples, the effectiveness of a battery management system may be greatly improved. In addition, the hazards associated with a decaying battery may be eliminated.

Referring now to FIG. 1, an example battery management system 100 is provided. The depicted example battery management system 100 of FIG. 1, shows a battery monitoring device 102 receiving state information from internal sensing elements 108 positioned to measure the state within a battery 104 and external sensing elements 110 positioned to measure the state outside the battery 104. The battery monitoring device 102 is also in communication with circuitry capable of providing information regarding external factors 112. In addition, the battery monitoring device 102 is electrically connected to battery mitigation equipment 106, allowing the battery monitoring device 102 to control the actions of the battery mitigation equipment 106 in relation to the battery 104 and the connected power source 114 and power load 116.

Figure 2:
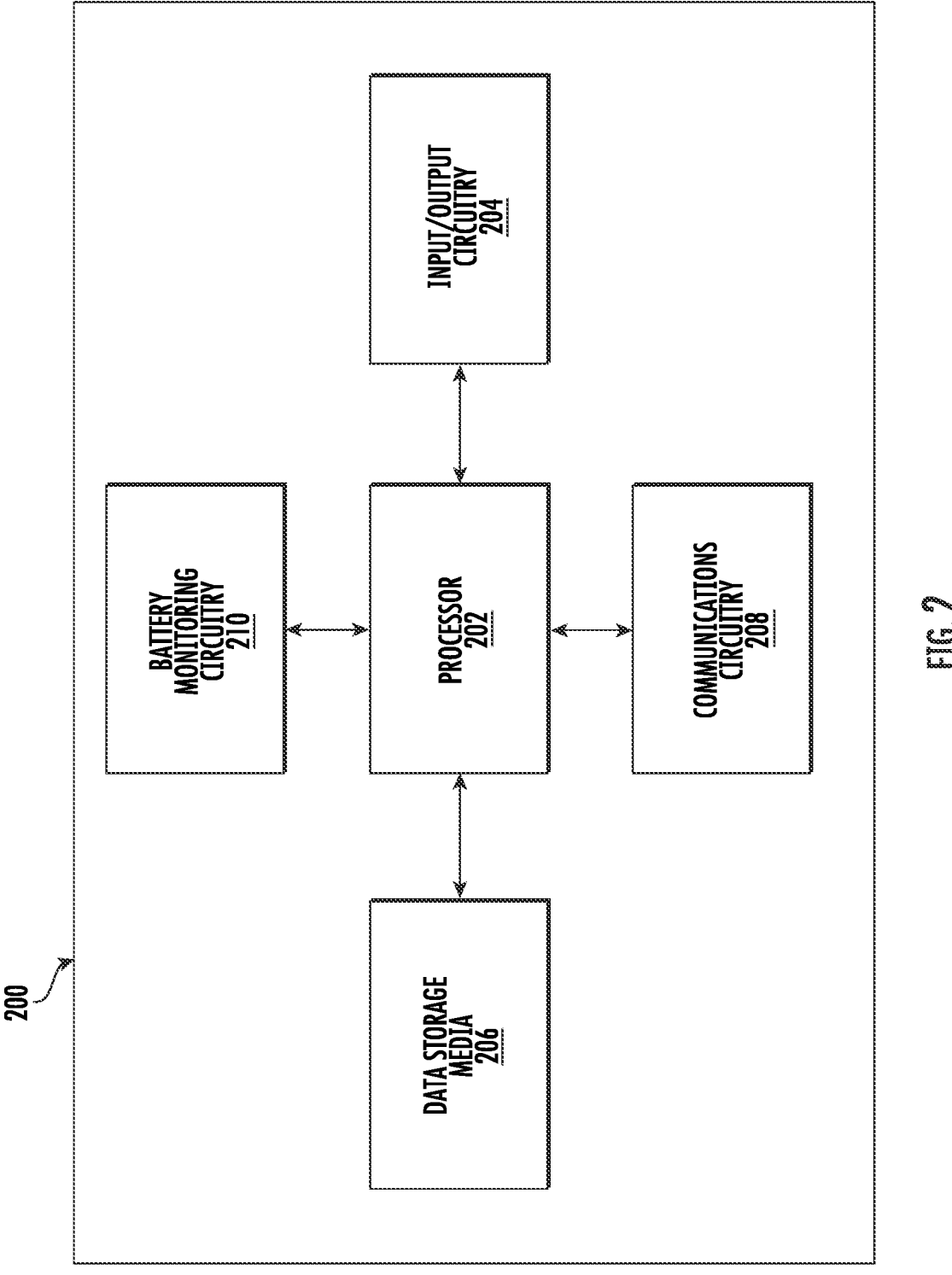
FIG. 2 illustrates an example block diagram showing example components of a battery monitoring device in accordance with an example embodiment of the present disclosure.

As depicted in FIG. 1, the example battery management system 100 includes a battery monitoring device 102. A battery monitoring device 102 (e.g., controller) may be any means such as a device or circuitry embodied in either hardware or a combination of hardware and software that is configured to receive input data related to the state of the battery 104 and/or other considerations (e.g., external factors 112) and determine the condition of the battery based on the received inputs. As an example, the battery monitoring device 102 (e.g., controller) may comprise a form as shown in FIG. 2. While FIG. 2 provides an example battery monitoring device 102, it is noted that the scope of the present disclosure is not limited to the example shown in FIG. 2.

Figure 5:
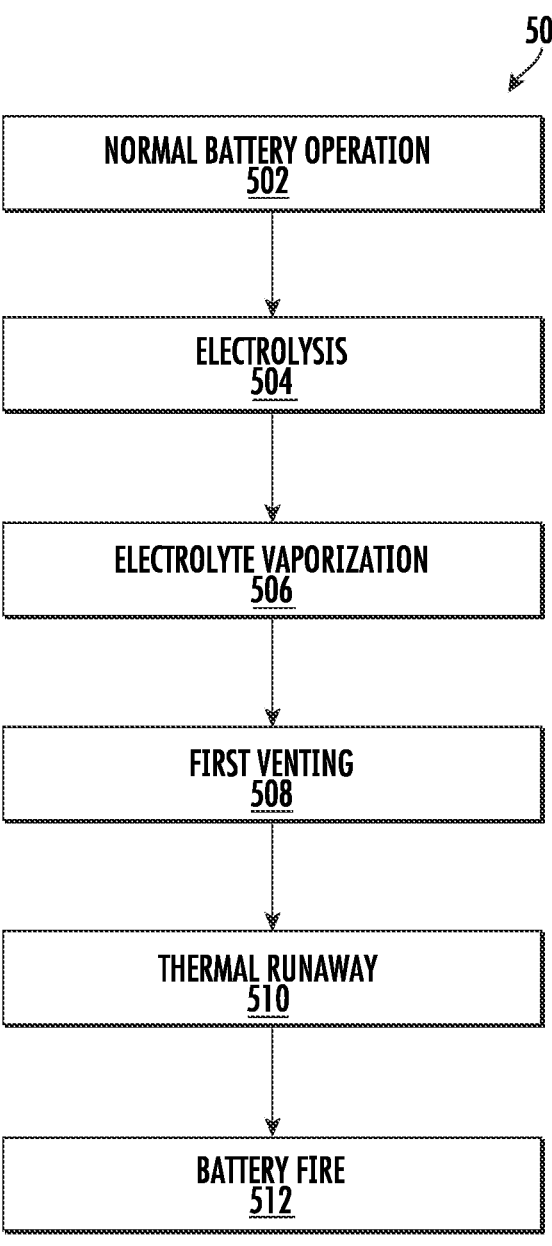
FIG. 5 depicts a block diagram illustrating the progression of battery decay in accordance with an example embodiment of the present disclosure.

In addition, the battery monitoring device 102 may be mechanically and/or electrically connected to the battery mitigation equipment 106. Establishing a connection with the battery mitigation equipment 106 allows a battery monitoring device 102 to perform mitigating actions based on the determined severity of the battery condition. For example, if based on the input levels from the internal sensing elements 108 and external sensing elements 110, the battery monitoring device 102 determines that there are anomalies in the battery condition but there is no immediate danger posed by the battery condition, the battery monitoring device 102 may cause the battery mitigation equipment 106 to perform a mitigating action that is non-destructive, such as disconnecting power to the battery 104 and/or isolating the battery 104 from an oxygen source which may accelerate the decay of the battery 104. Further, if the battery monitoring device 102 determines based on the input levels from the internal sensing elements 108 and the external sensing elements 110 that the battery 104 has or is quickly progressing through the decay states and is at risk of combusting, the battery monitoring device 102 may cause the battery mitigation equipment 106 to perform a destructive mitigating action in an effort to quell the potential hazard. FIG. 5 further explains the various stages of battery decay that may be detected by the battery monitoring device 102.

As further depicted in FIG. 1, an example battery management system 100 includes a battery 104. A battery 104 may comprise a lithium-ion battery, a lithium-polymer battery, an alkaline battery, or the like. In various examples, the battery 104 supplies power to facilitate operations of the operating device (e.g., an electric car). In general, a battery 104 utilizes a chemical reaction to supply power to produce the output power supply. As an example, when the battery 104 is discharging, the lithium ions move from the positive electrode/terminal to the negative electrode/terminal, releasing free electrons and providing an electric current to the operating device (e.g., electric car). In various examples, the battery 104 may be capable of re-charging. When the battery 104 is charging, the lithium ions move from the negative electrode/terminal to the positive electrode/terminal restoring the positively charged lithium ions to the anode. The battery 104 used to operate an electric vehicle can be quite extensive, requiring a significant number of chemical reactions. Such batteries (e.g., lithium-ion batteries, lithium-polymer batteries, etc.) may be prone to thermal runaway and eventual combustion as a result of mechanical, electrical and/or thermal stress and abuse.

The example battery management system 100 of FIG. 1 further includes battery mitigation equipment 106. The battery mitigation equipment 106 may include any hardware, software, electro-mechanical devices, switches, circuitry, materials, mitigating substances, actuating devices, conduits, or similar structures required to perform a mitigating action on the battery 104 based on the severity of a detected battery 104 condition and determined by the battery monitoring device 102. In various examples, the battery mitigation equipment 106 may be capable of receiving electrical and/or mechanical input from the battery monitoring device 102 such that a mitigating action is performed by the battery mitigation equipment 106.

The battery mitigation equipment 106 may be capable of executing both destructive and non-destructive mitigating actions. A non-destructive mitigating action is any action performed to change the state of an operational battery in an attempt to terminate the progression of battery decay. After a non-destructive mitigating action is performed, a battery 104 may still be usable with minimal or no repair. For example, in some embodiments, breaking the connection between the battery 104 and a power source 114 or a power load 116 may be a non-destructive mitigating action. As an additional example, in some embodiments, isolating the battery 104 from receiving oxygen, which may fuel the battery decay, may be a non-destructive mitigating action alternative. A destructive mitigation action is any action performed to terminate the progression of battery decay, after which, the battery 104 is no longer operational. An example of a destructive mitigating action may include injecting a substance into the interior of the battery 104 that destroys the internal components of the battery 104 and/or destructively isolates the components from receipt of oxygen.

As further depicted in FIG. 1, the example battery management system 100 includes internal sensing elements 108 and external sensing elements 110. Internal sensing elements 108 may be any electrical, mechanical, and/or electromechanical devices capable of detecting or measuring a physical property associated with the interior compartment of the battery 104. internal sensing elements 108 may be attached to the interior surface of the battery 104 or any component on the interior of the battery 104. Non-limiting examples of internal sensing elements 108 may include pressure sensors, force sensors, temperature sensors, moisture sensors, light sensors, gas sensors, alcohol sensors, gyroscope sensors, and the like. One or more internal sensing elements 108 may be coupled with circuitry to provide an electrical output representing the measured physical property which may be transmitted to the battery monitoring device 102. Similarly, external sensing elements 110 may be any electrical, mechanical, and/or electromechanical devices capable of detecting or measuring a physical property at or near the exterior of the battery 104. In some embodiments, one or more external sensing elements 110 may be attached to the external surface of the battery 104 or any component near the battery 104 such that the one or more external sensing elements 110 provide insight into the environment surrounding the battery 104. Non-limiting examples of external sensing elements 110 may also include pressure sensors, force sensors, temperature sensors, moisture sensors, light sensors, gas sensors, alcohol sensors, gyroscope sensors, and the like. Similar to the internal sensing elements 108, one or more external sensing elements 110 may be coupled with circuitry to provide an electrical output representing the measured physical property which may be transmitted to the battery monitoring device 102. In some embodiments, the battery monitoring device 102 may communicate with the battery mitigation equipment 106, the internal sensing elements 108, and/or the external sensing elements 110 through wireless protocols, for example, IEEE 802.11 Wi-Fi, near field communication (NFC) protocols, Wibree, Bluetooth protocols, wireless universal serial bus (USB) protocols, and/or any other wireless protocol.

As further depicted in FIG. 1, the example battery management system 100 may access external factors 112. The battery monitoring device 102 may utilize the input of external factors 112 to determine the condition and/or the severity of the battery condition. external factors 112 may include characteristics of the particular system, such as the volume of the battery compartment, the output characteristics of the battery, the type of charger, the output characteristics of the charger, the location of the vehicle (country, altitude, etc.) and so on. These characteristics may be provided at the time of deployment of the battery management system 100, and/or may be determined based on communication with the various system components. In some embodiments, external factors 112 may be obtained from connected network sources, such as a web or satellite interface, a remote server, and/or the like. external factors 112 obtained from a connected network source may include real-time location, updated information regarding the specific battery 104 and/or charger, real-time data related to battery operation, and so on. A battery monitoring device 102 may utilize these external factors 112 to determine the severity of the battery condition and/or the risk associated with the battery system, charger, and/or surrounding environment.

FIG. 2 illustrates an example battery monitoring apparatus in accordance with at least some example embodiments of the present disclosure. Specifically, FIG. 2 depicts an example battery monitoring apparatus 200 specially configured in accordance with at least some example embodiments of the present disclosure. In some embodiments, the battery monitoring device 102 and/or a portion thereof is embodied by one or more system(s), such as the battery monitoring apparatus 200 as depicted and described in FIG. 2. The battery monitoring apparatus 200 includes processor 202, input/output circuitry 204, data storage media 206, communications circuitry 208, and battery monitoring circuitry 210. In some embodiments, the battery monitoring apparatus 200 is configured, using one or more of the sets of circuitry 202, 204, 206, 208, and/or 210, to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the battery monitoring apparatus 200 provide or supplement the functionality of other particular sets of circuitry. For example, the processor 202 in some embodiments provides processing functionality to any of the sets of circuitry, the data storage media 206 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the data storage media 206 via a bus for passing information among components of the battery monitoring apparatus 200. In some embodiments, for example, the data storage media 206 is non-transitory and may include, for example, one or more volatile and/or nonvolatile memories. In other words, for example, the data storage media 206 in some embodiments includes or embodies an electronic storage device (e.g., a computer readable storage medium). In some embodiments, the data storage media 206 is configured to store information, data, content, applications, instructions, or the like, for enabling the battery monitoring apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the battery monitoring apparatus 200, and/or one or more remote or "cloud" processor(s) external to the battery monitoring apparatus 200.

In an example embodiment, the processor 202 is configured to execute instructions stored in the data storage media 206 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with the management of an operating battery 104, for example to execute a mitigating action based on the severity of a detected condition of the battery 104. In some embodiments, the processor 202 includes hardware, software, firmware, and/or a combination thereof, that receives sensing information from one or more sensing elements internal to the battery 104 and/or one or more sensing elements external to the battery 104. Additionally or alternatively, in some embodiments, the processor 202 includes hardware, software, firmware, and/or a combination thereof, that determines the battery 104 condition based on the sensing information. Additionally or alternatively, in some embodiments, the processor 202 includes hardware, software, firmware, and/or a combination thereof, that selects a mitigating action from a plurality of mitigating actions based at least in part on the battery condition. Additionally or alternatively, in some embodiments, the processor 202 includes hardware, software, firmware, and/or a combination thereof, that causes the selected mitigating action to be performed.

In some embodiments, the battery monitoring apparatus 200 includes input/output circuitry 204 that provides output to the user and, in some embodiments, to receive an indication of a user input. In some embodiments, the input/output circuitry 204 is in communication with the processor 202 to provide such functionality. The input/output circuitry 204 may comprise one or more user interface(s) (e.g., user interface) and in some embodiments includes a display that comprises the interface(s) rendered as a web user interface, an application user interface, a user device, a backend system, or the like. The processor 202 and/or input/output circuitry 204 comprising the processor may be configured to control one or more functions of one or more user interface elements through computer program instructions (e.g., software and/or firmware) stored on a memory accessible to the processor (e.g., data storage media 206, and/or the like). In some embodiments, the input/output circuitry 204 includes or utilizes a user-facing application to provide input/output functionality to a client device and/or other display associated with a user.

In some embodiments, the battery monitoring apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the battery monitoring apparatus 200. In this regard, the communications circuitry 208 includes, for example in some embodiments, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device in communication with the battery monitoring apparatus 200.

The battery monitoring circuitry 210 includes hardware, software, firmware, and/or a combination thereof, that supports various functionality associated with receiving battery 104 condition data from internal sensing elements 108 and external sensing elements 110; receiving and/or requesting information related to external factors 112; and executing actions on battery mitigation equipment 106. For example, in some embodiments, the battery monitoring circuitry 210 includes hardware, software, firmware, and/or a combination thereof to initialize and calibrate sensors positioned in, on, or near the battery 104 to detect a physical condition of the battery 104. Additionally or alternatively, in some embodiments, the battery monitoring circuitry 210 includes hardware, software, firmware, and/or a combination thereof, that receives, decodes, and/or otherwise processes sensor data received from the one or more internal sensing elements 108 and/or external sensing elements 110. Additionally or alternatively, in some embodiments, the battery monitoring circuitry 210 includes hardware, software, firmware, and/or a combination thereof, that receives and/or requests information related to external factors 112, for example, via a network interface, and/or communication interface to connected components. Additionally, or alternatively the battery monitoring circuitry 210 includes hardware, software, firmware, and/or a combination thereof, that prepares and/or transmits electronic data signals to activate mitigating actions, for example, electronic signals to trigger actuating elements, alter the state of switches, configure and/or reconfigure mitigation devices, and/or the like. In some embodiments, the battery monitoring circuitry 210 includes a separate processor, specially configured field programmable gate array (FPGA), or a specially programmed application specific integrated circuit (ASIC).

Additionally or alternatively, in some embodiments, one or more of the sets of circuitry 202-210 are combinable. Additionally or alternatively, in some embodiments, one or more of the sets of circuitry perform some or all of the functionality described associated with another component. For example, in some embodiments, one or more sets of circuitry 202-210 are combined into a single module embodied in hardware, software, firmware, and/or a combination thereof. Similarly, in some embodiments, one or more of the sets of circuitry, for example battery monitoring circuitry 210, is/are combined such that the processor 202 performs one or more of the operations described above with respect to each of these circuitry individually.

Figure 3:
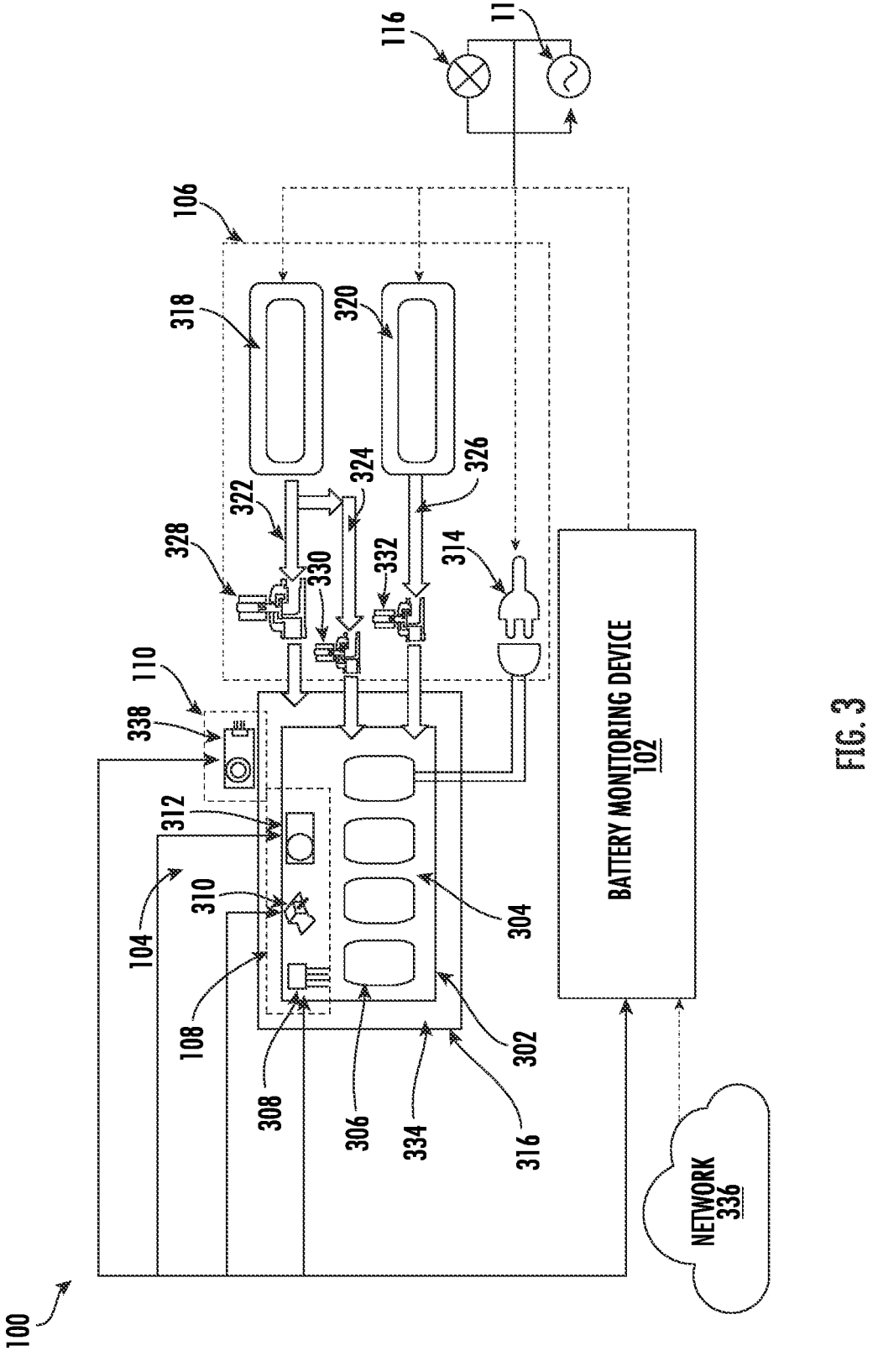
FIG. 3 illustrates a detailed diagram of a battery management system configured to mitigate a detected battery condition in accordance with an example embodiment of the present disclosure.

Referring now to FIG. 3, a detailed component diagram of an example battery management system 100 is provided. The depicted example battery management system 100 of FIG. 3, shows a battery 104 including a battery housing 302 defining an interior battery compartment 304. Further depicted is an exterior wall 316 external to the battery housing 302 and fully enclosing the battery housing 302, defining a space (e.g., battery wall cavity 334) between the exterior wall 316 and the battery housing 302. The depiction of FIG. 3 further contains a plurality of battery cells 306 disposed within the battery housing 302 in the interior battery compartment 304. In addition, contained within the interior battery compartment 304 are internal sensing elements 108, including a temperature sensor 308, pressure sensor 310, and gas sensor 312. Further depicted proximate the exterior wall 316 of the battery 104 is a gas sensor 312. The depicted example battery management system 100 of FIG. 3 further contains a battery monitoring device 102 communicatively connected to the internal sensing elements 108, the external sensing elements 110, a network 336, and the battery mitigation equipment 106. As depicted in FIG. 3, the battery mitigation equipment 106 may further comprise a switching mechanism (e.g., power cut-off switch 314) on the electrical connection from the battery 104 to the power source 114 and the power load 116. The depicted example battery mitigation equipment 106 of FIG. 3, further includes a first polymer reservoir 318 fluidly connected to the battery wall cavity 334 via a first fluid conduit 322 and fluidly connected to the interior battery compartment 304 via a second fluid conduit 324. The depicted battery mitigation equipment 106 further includes a second polymer reservoir 320 fluidly connected to the interior battery compartment 304 via third fluid conduit 326. Each of the fluid conduits (e.g., first fluid conduit 322, second fluid conduit 324, third fluid conduit 326) further include an actuating element (e.g., first actuating element 328, second actuating element 330, third actuating element 332) providing a mechanism to restrict and/or enable the flow of fluid through the fluid conduit through electro-mechanical or similar means.

As depicted in FIG. 3, the example battery 104 includes a battery housing 302. A battery housing 302 may be any enclosure capable of enclosing and protecting the internal components of the battery 104. In some non-limiting examples, a battery housing 302 may comprise aluminum, steel, or other metals; plastics and/or reinforced plastics; or any other material capable of protecting the interior components and battery cells 306 of the battery 104. The battery housing 302 defines a space or compartment (e.g., interior battery compartment 304) into which the internal battery components and/or internal sensing elements 108 may be disposed. In some embodiments, the battery housing 302 may provide structures to support, attach, and/or separate the battery cells 306, internal sensing elements 108, wiring, and/or other internal components of the battery 104. Additionally or alternatively, a battery housing 302 may include structures and/or devices to provide cooling to the internal components of the battery 104 including but not limited to fluid and/or air flow. The battery housing 302 may further comprise structures and/or materials to provide further protection to the internal components of the battery 104.

Contained within the battery housing 302 of the example battery 104 of FIG. 3 is a plurality of battery cells 306. The battery cells 306 may take many forms, including but not limited to cylindrical cells, prismatic cells, pouch cells, etc. The battery cells 306 may be attached and/or separated by structures defined in the battery housing 302. Additionally, the battery cells 306 may be electrically connected in parallel and/or series to provide an accumulated power output to the operating device (e.g., an electric vehicle). Each battery cell 306 may house chemical components which undergo a chemical process to generate electrical current. The chemical components of the battery cells 306 may comprise numerous compositions, for example, lithium-ion, lithium-polymer, lithium-iron phosphate, lithium Sulphur, and other lithium based compositions; nickel manganese cobalt; nickel metal hydride; lead acid; or any other chemical composition capable of providing sufficient electrical current through a chemical process. The chemical process occurring within the battery cells 306 may be subject to a decay process further described in relation to FIG. 5 that can lead to hazardous conditions including combustion.

The depicted interior battery compartment 304 of FIG. 3 also includes one or more internal sensing elements 108. The internal sensing elements 108 shown in FIG. 3 include a temperature sensor 308, a pressure sensor 310, and a gas sensor 312. However, as described with reference to FIG. 1 various sensing elements may be used to determine a physical characteristic in relation to the interior battery compartment 304. The internal sensing elements 108 (e.g., temperature sensor 308, pressure sensor 310, gas sensor 312) may be capable of converting the sensed physical characteristic into an electrical output capable of interpretation by the battery monitoring device 102 or other electrical device. In some embodiments, one or more of the internal sensing elements 108 may transmit and receive data through a wired connection, while in some embodiments, data may be transmitted and received through wireless protocols. The internal sensing elements 108 may be capable of calibration, re-calibration, and/or configuration through wireless/wired communication from the battery monitoring device 102 or another connected device.

The example internal sensing elements 108 of FIG. 3 include a temperature sensor 308. A temperature sensor 308 may be any electronic or electro-mechanical device capable of measuring the temperature of the surrounding environment and converting the measured temperature into an analog or digital electrical signal capable of being decoded by a battery monitoring device 102 or other intermediate component circuitry. The detected temperature in the interior battery compartment 304 may be an important factor in detecting and determining the severity of battery decay, as further explained in relation to FIG. 5.

The example internal sensing elements 108 of FIG. 3 further include a pressure sensor 310. A pressure sensor 310 may be any electronic or electro-mechanical device capable of measuring the pressure of the surrounding environment and converting the measured pressure into an analog or digital electrical signal capable of being decoded by a battery monitoring device 102 or other intermediate component circuitry. The detected pressure in the interior battery compartment 304 may also be an important factor in detecting and determining the severity of battery decay, as further explained in relation to FIG. 5.

The example internal sensing elements 108 of FIG. 3 also include a gas sensor 312. A gas sensor 312 may be any electronic or electro-mechanical device capable of measuring the concentration of one or more gasses in the surrounding environment and converting the measured concentration level into an analog or digital electrical signal capable of being decoded by a battery monitoring device 102 or other intermediate component circuitry. A gas sensor 312 may comprise a single sensing element capable of determining the concentration level of a plurality of disparate gasses. A gas sensor 312 may comprise one or more sensing elements each configured to determine the concentration level of a particular gas. As non-limiting examples, the gas sensor 312 may determine the concentration level of methane, carbon, diethyl carbonate, oxygen, hydrogen, and other similar gasses. The detected concentrations of these and other gases in the interior battery compartment 304 may be another important factor in detecting and determining the severity of battery decay, as further explained in relation to FIG. 5.

The depicted battery management system 100 of FIG. 3 also includes one or more external sensing elements 110. The depicted external sensing element 110 of FIG. 3 is an alcohol sensor 338. In general, external sensing elements 110 may provide valuable information regarding the environment surrounding the battery 104 of a battery management system 100. Information regarding the physical environment surrounding the battery 104 may assist in determining the severity of the battery condition. For example, if a alcohol sensor 338 measures an elevated level of alcohol or ethanol fumes in the environment surrounding the battery, combustion may be more likely and the mitigating action selected may need to be more urgent. external sensing elements 110 may additionally or alternatively be utilized to detect moisture, temperature, pressure, or other gasses, to determine the severity and required mitigating action in reaction to a battery condition.

The depicted battery mitigation equipment 106 of FIG. 3 comprises a number of structures and/or devices for executing various levels of mitigating actions based on the severity of the battery condition and the physical state of the surrounding environment. An example non-destructive mitigating action may include disconnecting the battery 104 from a power source 114 and/or a power load 116. A power source 114 may be any source of power utilized to charge the battery 104. In some embodiments, a charge may be provided by an Alternating Current (AC) terminal, by a DC power source, through a trickle charging device, or by any other method. A power load 116 may be any device or process that uses the power generated by the power source 114 during operation. A switching mechanism (e.g. power cut-off switch 314) may be disposed on the electrical connection between the battery 104 and the power source 114 and/or power load 116. A switching mechanism may be any electrical or electro-mechanical device, switch, or other mechanism to disable electrical flow between the battery 104 and the power source 114 and/or power load 116. Disconnecting the battery 104 from the power source 114 and the power load 116 may terminate any progression in battery decay and prevent thermal runaway and combustion of the battery. In some embodiments, the power cut-off switch 314 may temporarily disconnect the power source 114 and power load 116, while in other embodiments, the power cut-off switch 314 may permanently disconnect the power source 114 until the battery 104 is manually reconnected to the power source 114 and/or power load 116. By disconnecting the battery 104 from the power source 114 and the power load 116, electrical flow is stopped which may be one factor fueling battery decay. Disconnecting the battery 104 from the power source 114 and the power load 116 is a non-destructive mitigating event since the battery 104 may become operational again when the power source 114 and the power load 116 are reconnected.

The depicted battery mitigation equipment 106 of FIG. 3 further comprises a first fluid conduit 322 capable of allowing fluid flow between a first polymer reservoir 318 and the battery wall cavity 334 between the battery housing 302 and the exterior wall 316. In some embodiments, a mitigating action may be dependent on combining two materials that when mixed form a solid capable of blocking the flow of oxygen to the interior battery compartment 304 and the battery cells 306. A non-destructive mitigating action involves forming an isolating barrier in the battery wall cavity 334 surrounding the battery housing 302 by combining two epoxy resins which when combine form an isolating solid. In an example embodiment, the battery wall cavity 334 is pre-filled with a first epoxy resin. An isolating solid barrier may be formed in the battery wall cavity 334 by allowing the flow of a second epoxy resin contained in the first polymer reservoir 318 to flow through the first fluid conduit 322 and into the battery wall cavity 334, where it mixes with the first epoxy resin and forms a solid which isolates the interior battery compartment 304 and the battery cells 306 from receiving oxygen flow. By cutting off the flow of oxygen from the chemical reactions, the chemical reaction and progressing battery decay may be terminated. The flow of the second epoxy resin from the first polymer reservoir 318 to the battery wall cavity 334 is controlled by a first actuating element 328 disposed on the first fluid conduit 322.

The battery mitigation equipment 106 of FIG. 3 further depicts actuating elements to control the flow of fluid from the polymer reservoirs. An actuating element (e.g., first actuating element 328, second actuating element 330, third actuating element 332) may be any electrical, or electro-mechanical device configured to open or close a fluid conduit when an electrical voltage is applied or disconnected. For example, an actuating element (e.g., first actuating element 328, second actuating element 330, third actuating element 332) may be in a closed position, preventing the flow of fluid through the fluid conduit. When a voltage is applied to the actuating element, the actuating may open, allowing the flow of fluid through the fluid conduit. If the voltage is removed, the actuating element may return to a closed position. In some embodiments, the voltage may be applied by the battery monitoring device 102 or by intermediate circuitry at the direction of the battery monitoring device 102.

The battery mitigation equipment 106 of FIG. 3 further depicts equipment capable of executing a destructive mitigating event in response to a detected hazardous or potentially hazardous battery condition. A second fluid conduit 324 is depicted connecting the first polymer reservoir 318 containing a first epoxy resin to the interior battery compartment 304. The flow of fluid on the second fluid conduit 324 is controlled by a second actuating element 330. FIG. 3 further depicts a second polymer reservoir 320 containing a second epoxy resin. The second polymer reservoir 320 is fluidly connected to the interior battery compartment 304 by a third fluid conduit 326 with the flow of fluid controlled by a third actuating element 332. When the conditions of the battery and surrounding environment warrant the execution of a destructive mitigating event, both the second actuating element 330 and the third actuating element 332 may be opened, allowing the flow of the first epoxy resin and the second epoxy resin into the interior battery compartment 304. When the two epoxy resins combine in the interior battery compartment 304, a solid will be formed cutting off oxygen from the chemical reactions and destroying the battery 104.

In some embodiments, the polymer reservoirs (e.g. first polymer reservoir 318 and second polymer reservoir 320) may be pressurized, such that when the corresponding actuating element is opened, the release of the contained epoxy resin is accelerated. When utilizing pressurized polymer reservoirs, full release of the epoxy resins may occur within milliseconds.

While the primary focus of the disclosure describes two epoxy resins combining to create an isolating solid, any combination of liquid, solids, powders, gasses, semi-solids, plasma, or any other matter state may be combined to create a solid which acts to isolate the interior battery compartment 304 and the battery cells 306 from oxygen sources. For example, the battery wall cavity 334 may be pre-filled with a solid or powder and the first polymer reservoir 318 may contain a fluid that turns to a solid when mixed with the pre-filled solid or powder. Upon the opening of the first actuating element 328, the pre-filled solid and powder may mix with the fluid in the battery wall cavity 334, forming a solid and cutting off oxygen flow to the chemical reactions.

Referring now to FIG. 4, an example flow diagram illustrating an example method 400 for mitigating a detected battery condition is illustrated, in accordance with some embodiments of the present disclosure. The example method 400 starts at block 402 when a battery monitoring device 102 receives sensing information from one or more internal sensing elements 108 (e.g., a temperature sensor 308, a pressure sensor 310, a gas sensor 312) attached to a battery housing 302 within an interior battery compartment 304 defined by the battery housing 302. As described in relation to FIG. 1 and FIG. 3, internal sensing elements 108 such as temperature sensor 308, pressure sensor 310, and gas sensor 312, may be attached within the interior of the battery housing 302 to detect the physical conditions of the interior battery compartment 304. The one or more internal sensing elements 108 may convert the measured physical condition into an electrical signal which may be transmitted via electrical connection or via wireless protocol to the battery monitoring device 102. Internal sensing elements 108 may provide information regarding pressures, forces, temperature, moisture, light, gas, alcohol, and the like within the interior battery compartment 304.

At block 404, the battery monitoring device 102 receives sensing information from one or more external sensing elements 110 (e.g., alcohol sensor 338) disposed proximate the exterior of the battery 104. As described in relation to FIG. 1 and FIG. 3, external sensing elements 110 such as alcohol sensor 338, may be attached on or near the exterior of the battery 104 to detect the physical conditions of the environment around the battery 104. The one or more external sensing elements 110 may convert the measured physical condition into an electrical signal which may be transmitted via electrical connection or via wireless protocol to the battery monitoring device 102. external sensing elements 110 may provide information regarding pressures, forces, temperature, moisture, light, gas, alcohol, and the like at or near the battery 104.

At block 406, the battery monitoring device 102 determines the battery condition based on the sensing information received from the internal sensing elements 108 and/or the external sensing elements 110 and/or considering external factors 112. As further described in relation to FIG. 5, a battery monitoring device 102 may use the data returned by the internal sensing elements 108 to determine the physical condition of the interior battery compartment 304. The battery monitoring device 102 may determine if the battery is operating under normal conditions and/or if the battery 104 has started into battery decay. The battery monitoring device 102 may further utilize information from the external sensing elements 110 concerning the physical state of the surrounding environment to determine if the potential hazardous conditions are of higher risk based on the surrounding environment. In addition, the battery monitoring device 102 may receive and/or request external factors 112 related to the operating location, the battery system equipment, and/or aggregated user information to determine the severity of the battery condition.

At block 408, the battery monitoring device 102 selects a mitigating action from a plurality of mitigating actions based at least in part on the battery condition, wherein the plurality of mitigating actions comprises at least a non-destructive mitigating action and a destructive mitigating action. As depicted in FIG. 3, a battery management system 100 may comprise battery mitigation equipment 106 capable of performing a plurality of mitigating actions based on the severity of the battery condition. As depicted in FIG. 3, non-destructive mitigating actions may include disconnecting the power source 114 and/or the power load 116 from the battery, or isolating the chemical reactions occurring in the interior battery compartment 304 by filling the battery wall cavity 334 with a mixture of fluids which solidify in the battery wall cavity 334 and isolate the interior battery compartment 304 from any source of oxygen. An example destructive mitigating action is also shown in FIG. 3, in which a mixture of fluids is injected into the interior battery compartment 304. Once the mixture of fluids combine in the interior battery compartment 304 they solidify and isolate the battery cells 306 from oxygen. In some embodiments, one or more of the mitigating actions depending on the continuing battery condition.

At block 410, the battery monitoring device 102 causes the selected mitigating action to be performed. A battery monitoring device 102 may transmit electronic signals through wired connections or wireless communications to intermediate circuitry or directly to the battery mitigation equipment 106. The battery monitoring device 102 may, in some embodiments, need to send a sequence of signals to ensure the appropriate mitigating action is performed. As one example, the battery monitoring device 102 may transmit a signal to disconnect the power cut-off switch 314. As another example, the battery monitoring device 102 may transmit a signal and/or apply a voltage to the first actuating element 328 to allow the release of the second epoxy resin into the battery wall cavity 334 pre-filled with a first epoxy resin, which, when mixed solidify to isolate the interior battery compartment 304 from oxygen sources. As a third example, the battery monitoring device 102 may transmit a signal and/or apply a voltage to both the second actuating element 330 and the third actuating element 332 to release both the first epoxy resin and the second epoxy resin into the interior battery compartment 304. The first and second epoxy resin, when mixed may form a solid in the interior battery compartment 304, isolating the chemical reactions of the battery mitigation equipment 106 from oxygen sources and destroying the battery 104.

Referring now to FIG. 5, an example block diagram is provided illustrating a process 500 depicting the stages of battery decay, in accordance with some embodiments of the present disclosure.

At block 502, the battery 104 is in a state of normal operation. In this state, the temperature inside the interior battery compartment 304 is in a normal operating range. The normal operating range will vary based on the physical characteristics of the battery 104, the capacity of the battery 104, the volume of the interior battery compartment 304, the materials of the battery housing 302, the cooling mechanisms associated with the battery 104, and other factors. In some embodiments, the normal operating temperature, pressure, gas readings, and other physical characteristic may be determined based on normal use and/or aggregated data from users in an environment with similar environments. By way of example, the normal operating temperature may be between 20° C. and 80° C. and the normal operating pressure may be anything less than 14.5 pounds per square inch.

At block 504, the battery 104 moves into an electrolysis state 504. During the electrolysis state 504, the electrolyte begins to break down between the anode and cathode within the battery cells 306. The electrolysis state 504 is characterized by elevated gas levels specifically elevated gas levels of oxygen and hydrogen. The operating temperature and the pressure readings remain constant, in a normal operating range for the battery management system 100 and the environment during electrolysis. For example, the operating temperature may be between 20° C. and 80° C., while the pressure remains below about 14.5 pounds per square inch.

At block 506, the battery 104 moves into an electrolyte vaporization state 506. During the electrolyte vaporization state 506, the electrolyte between the anode and cathode within the battery cells 306 fully breaks down. The electrolyte vaporization state 506 is characterized by elevated levels of methane, carbon, and diethyl carbonate. The vaporization stage may also be characterized by an elevated temperature, for example, between 80° C. and 100° C.

At block 508, the battery 104 moves into a first venting state 508. During the first venting state 508, the buildup of gas due to the decomposition of the electrolyte inside the battery cell 306 can cause deformations in the casing of the battery cell 306 and eventual openings or rupture in the battery cell 306. The first venting state 508 is characterized by an initial increase in temperature and elevated gas levels of oxygen, hydrogen, methane, carbon, and diethyl carbonate. In addition, the first venting state 508 may be characterized by an increase in the internal pressure of the interior battery compartment 304, for example a pressure above 14.5 pounds per square inch. In some embodiments, a temperature between 120° C. and 300° C. within the interior battery compartment 304 may be an indicator that the battery 104 has entered into the first venting state 508.

At block 510, the battery 104 moves into a thermal runaway state 510. During the thermal runaway state 510, chemical reactions within the battery cells 306 continue due to an increase in temperature causing a severe and sudden increase of temperature. In some embodiments, the thermal runaway state 510 is characterized by a temperature at or exceeding 300° C. and less than 800° C.

At block 512, the final stage of battery decay is depicted, the battery fire state 512. A battery fire is generally characterized by a temperature at or exceeding 800° C. Once a battery enters the battery fire state 512, the uncontrolled combustion is extremely hazardous to the operating device and any people and objects in close proximity.

Figure 6:
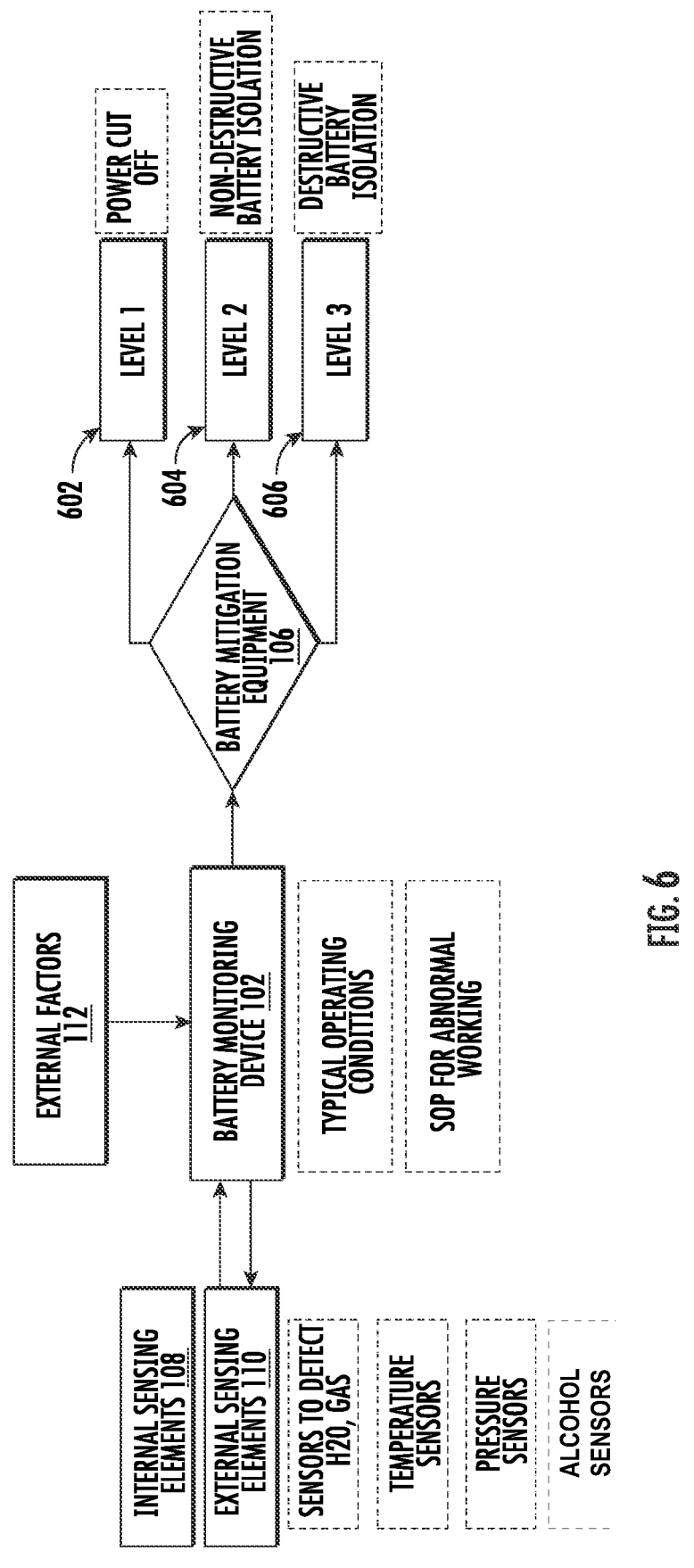
FIG. 6 depicts a flowchart illustrating example outcomes of the battery management system based on provided inputs in accordance with an example embodiment of the present disclosure.

Referring now to FIG. 6, an example flowchart is provided illustrating example outcomes of the battery management system 100 based on provided inputs in accordance with an example embodiment of the present disclosure.

As described in relation to FIG. 1 and FIG. 3, a battery monitoring device 102 may receive information related to the physical condition of the battery 104 and the surrounding environment. Information regarding the physical state of the interior battery compartment 304 may be provided by one or more internal sensing elements 108 (e.g., temperature sensor 308, pressure sensor 310, gas sensor 312). Information from the internal sensing elements 108 may include information relative to the temperature within the interior battery compartment 304, the pressure within the interior battery compartment 304, and or the concentration of certain gases within the interior battery compartment 304 (e.g., oxygen, hydrogen, methane, carbon, and diethyl carbonate). Information regarding the surrounding environment of the battery 104 may be provided by one or more external sensing elements 110 (e.g., alcohol sensor 338). Information from the external sensing elements 110 may provide insight into the environment around the battery 104 particularly in relation to, flammable gases, moisture, temperature, pressure, and the like. A battery monitoring device 102 may further receive and/or request data pertaining to external factors 112 via a connected network 336. external factors 112 may include but are not limited to, the location of the operating device; the altitude of the operating device; information regarding normal operating temperature, pressure, and gas levels of the battery 104 and the battery housing 302 based on testing or aggregated user information; information in regard to the battery 104 charger; and other relevant information.

As depicted in FIG. 6, a battery monitoring device 102 may determine the mitigating action based on the severity of the battery condition determined from the inputs from the internal sensing elements 108, external sensing elements 110, and/or external factors 112. The battery monitoring device 102 may then select a mitigating action based on the determined severity of the battery condition. FIG. 6 illustrates three levels of mitigating actions. In some embodiments, a battery monitoring device 102 may determine a normal operating temperature within the interior battery compartment 304, a normal operating pressure within the interior battery compartment 304, and normal gas levels within the interior battery compartment 304 based on previous use, pre-determined values, and/or aggregated user data.

As depicted in FIG. 6, a battery monitoring device 102 may cause the battery mitigation equipment 106 to perform a level 1 non-destructive mitigating action 602, such as disconnecting power from the battery monitoring device 102 using a switching mechanism (e.g., power cut-off switch 314). A level 1 non-destructive mitigating action 602 may terminate the progression of a battery monitoring device 102 in the battery decay process 500 with minimal to know damage to the battery management system 100 and reuse of the battery 104 due to the non-destructive nature of the mitigating action.

As an example, the battery monitoring device 102 may continually monitor the temperature, pressure, and gas levels throughout the operational life of the battery. If a battery monitoring device 102 detects an increase in oxygen and/or hydrogen levels above the normal levels, and/or if the battery monitoring device 102 detects a sudden increase in oxygen and/or hydrogen levels, the battery monitoring device 102 may determine the battery 104 has entered the electrolysis state 504 of battery decay process 500. Such a determination would likely warrant a less severe mitigating action, such as a level 1 non-destructive mitigating action 602. In general, a level 1 non-destructive mitigating action 602 may be utilized when the detected battery state is in an electrolysis state 504, an electrolyte vaporization state 506, or a first venting state 508, depending on the external factors 112.

As further depicted in FIG. 6, a battery monitoring device 102 may cause the battery mitigation equipment 106 to perform a level 2 non-destructive mitigating action 604. A level 2 non-destructive mitigating action 604 may employ additional measures that increase the chances of terminating the progression of the battery 104 toward a battery fire state 512, however, the level 2 non-destructive mitigating action 604 may be more difficult to resume operation of the operating device due to the nature of the mitigating action. For example, a level 2 non-destructive mitigating action 604 may include releasing epoxy resins into the battery wall cavity 334 surrounding the battery 104 such that the epoxy resins solidify and create an isolating barrier between any source of oxygen and the interior battery compartment 304.

As another example, if a battery monitoring device 102 detects an increase in the internal temperature and or pressure of the interior battery compartment 304 above the normal operating levels, and/or if the battery monitoring device 102 detects a sudden increase in the internal temperature and/or pressure, along with elevated gas levels, the battery monitoring device 102 may determine the battery 104 has entered the first venting state 508 of the battery decay process 500. Such a determination would likely warrant a more severe mitigating action while still preserving the battery 104, such as a level 2 non-destructive mitigating action 604. In general, a level 2 non-destructive mitigating action 604 may be utilized when the detected battery state is in a first venting state 508, or a thermal runaway state 510, depending on the external factors 112.

As further depicted in FIG. 6, a battery monitoring device 102 may cause the battery mitigation equipment 106 to perform a level 3 destructive mitigating action 606. A level 3 destructive mitigating action 606 may employ drastic measures that increase the chances of terminating the progression of the battery 104 toward a battery fire state 512 or extinguish a battery fire, however, the level 3 destructive mitigating action 606 may destroy the battery 104 such that it is no longer operational. For example, a level 3 destructive mitigating action 606 may include releasing epoxy resins into the interior battery compartment 304 such that the epoxy resins solidify within the interior battery compartment 304 and isolate the combusting chemical reactions from any oxygen source.

As an example, if a battery monitoring device 102 detects a drastic increase in temperature in the interior battery compartment 304, well above the normal operating temperature, and/or if the battery monitoring device 102 detects a sudden, drastic increase in the internal temperature of the interior battery compartment 304, the battery monitoring device 102 may determine the battery 104 has entered the thermal runaway state 510 of the battery decay process 500. Such a determination would likely warrant a severe mitigating action without concern for preserving the battery 104, such as a level 3 destructive mitigating action 606. In general, a level 3 destructive mitigating action 606 may be utilized when the detected battery state is in a thermal runaway state 510 or a battery fire state 512, depending on the external factors 112.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A battery management system, wherein the battery management system comprises:

a battery comprising:

a battery housing defining an interior battery compartment;

one or more battery cells disposed within the interior battery compartment; and

21 one or more internal sensing elements attached to the battery housing within the interior battery compartment;

an exterior wall enclosing one or more sides of the battery housing and defining a battery wall cavity between the battery housing and the exterior wall;

a first polymer reservoir disposed external to the exterior wall and holding a first polymer material;

a first polymer fluid conduit providing fluid communication between the first polymer reservoir and the battery wall cavity;

a first actuating element comprising an opened position and a closed position, wherein in an instance in which the first actuating element is in the closed position, flow from the first polymer reservoir to the battery wall cavity is substantially stopped, and in an instance in which the first actuating element is in the opened position, flow from the first polymer reservoir to the battery wall cavity is permitted; and a controller for electrical communication with the one or more internal sensing elements, the controller configured to:

select between a plurality of mitigating actions based at least in part on a battery condition, the plurality of mitigating actions comprising at least one non-destructive mitigating action and at least one destructive mitigating action.

2. The battery management system of claim 1, further comprising:

a switching mechanism to disengage an electrical power source and/or an electrical load connected to the battery, wherein a first non-destructive mitigating action of the at least one non-destructive mitigating action comprises utilizing the switching mechanism to disengage the electrical power source and/or the electrical load.

3. The battery management system of claim 1, further comprising:

a second polymer material disposed in the battery wall cavity defined between the battery housing and the exterior wall;

wherein a second non-destructive mitigating action of the at least one non-destructive mitigating action comprises opening the first actuating element such that the first polymer material interacts with the second polymer material in the battery wall cavity and prevents the interior battery compartment from receiving oxygen.

4. The battery management system of claim 1, further comprising:

a second polymer fluid conduit providing fluid communication between the first polymer reservoir holding the first polymer material and the interior battery compartment;

a second actuating element having an opened position and a closed position, wherein when the second actuating element is in the closed position, flow from the first polymer reservoir to the interior battery compartment is substantially stopped, and when the second actuating element is in the opened position, flow from the first polymer reservoir to the interior battery compartment is permitted;

a third polymer fluid conduit providing fluid communication between a second polymer reservoir holding a third polymer material and the interior battery compartment; and a third actuating element having an opened position and a closed position, wherein when the third actuating element is in the closed position, flow from the second polymer reservoir to the interior battery compartment is substantially stopped, and when the third actuating element is in the opened position, flow from the second polymer reservoir to the interior battery compartment is permitted;

wherein a first destructive mitigating action of the at least one destructive mitigating action comprises opening the second and third actuating elements such that the first polymer material interacts with a second polymer material in the interior battery compartment and prevents one or more components of the interior battery compartment from receiving oxygen.

5. The battery management system of claim 4, wherein the first polymer reservoir and the second polymer reservoir are pressurized.

6. The battery management system of claim 1, wherein the one or more internal sensing elements comprises at least one of a temperature sensing element, a pressure sensing element, and a gas sensing element.

7. The battery management system of claim 1, further comprising one or more external sensing elements proximate the exterior of the battery housing, wherein the controller selects between the plurality of mitigating actions based at least in part on an output of the one or more external sensing elements.

8. The battery management system of claim 7, wherein at least one of the one or more external sensing elements detects alcohol levels.

9. The battery management system of claim 1, wherein the battery condition may be one of normal operation, electrolysis, vaporization, first venting, thermal runaway, and fire.

10. A method for mitigating a battery condition of a battery, wherein the method comprises:

receiving sensing information from one or more internal sensing elements attached to a battery housing within an interior battery compartment defined by the battery housing;

determining the battery condition based on the sensing information;

selecting a mitigating action from a plurality of mitigating actions based at least in part on the battery condition, wherein the plurality of mitigating actions comprises at least one non-destructive mitigating action and one destructive mitigating action, wherein a first non-destructive mitigating action of the at least one non-destructive mitigating action comprises utilizing a switching mechanism to disengage an electrical power source and/or an electrical load, wherein a second non-destructive mitigating action of the at least one non-destructive mitigating action comprises interacting a first polymer material with a second polymer material in a cavity exterior to the interior battery compartment, such that the interaction of the first polymer material and the second polymer material prevents the interior battery compartment from receiving oxygen, and wherein a first destructive mitigating action of the at least one destructive mitigating action comprises interacting the first polymer material with a third polymer material in the interior battery compartment, such that the interaction of the first polymer material and the third polymer material prevents one or more components of the interior battery compartment from receiving oxygen; and causing the selected mitigating action to be performed.

11. The method of claim 10, wherein the one or more internal sensing elements comprises at least one of a temperature sensing element, a pressure sensing element, and a gas sensing element.

12. The method of claim 10, further comprising receiving additional sensing information from one or more external sensing elements disposed proximate the exterior of the battery.

13. The method of claim 10, wherein the battery condition may be one of normal operation, electrolysis, vaporization, first venting, thermal runaway, and fire.

14. A computer program product for mitigating a battery condition, the computer program product comprising at least one non-transitory computer-readable storage medium having computer-readable program code portions stored therein, the computer-readable program code portions comprising an executable portion configured to:

receive sensing information from one or more internal sensing elements disposed in the interior of a battery;

determine the battery condition based on the sensing information; and select a mitigating action from a plurality of mitigating actions based at least in part on the battery condition, wherein the plurality of mitigating actions comprises at least one non-destructive mitigating action and at least one destructive mitigating action, wherein a first non-destructive mitigating action of the at least one non-destructive mitigating action comprises utilizing a switching mechanism to disengage an electrical power source and/or an electrical load, wherein a second non-destructive mitigation action of the at least one non-destructive mitigating action comprises interacting a first polymer material with a second polymer material in a cavity exterior to an interior battery compartment, such that the interaction of the first polymer material and the second polymer material prevents the interior battery compartment from receiving oxygen, and wherein a first destructive mitigation action of the at least one destructive mitigating action comprises interacting the first polymer material with a third polymer material in the interior battery compartment, such that the interaction of the first polymer material and the third polymer material prevents one or more components of the interior battery compartment from receiving oxygen.

* * * * *